Patented Sept. 6, 1938

2,129,623

UNITED STATES PATENT OFFICE 2,129,623

RAYON TREATMENT

William Howard Nicol, Cuyahoga Falls, Ohio, assignor to Wingfoot Corporation, Wilmington, Del., a corporation of Delaware No Drawing. Application January 14, 1935, Serial No. 1,782

9 Claims. (Cl. 154—40)

This invention relates to the treatment of rayon and more particularly rayon cord or fabric which is to be used in the manufacture of automobile tires. The rayon may be regenerated cellulose, a cellulose ester such as cellulose acetate, nitrocellulose or other cellulosic material. Because it is formed by extrusion it has a smooth surface and it has been found desirable to treat rayon which is to be used in the manufacture of rubber goods such as tires, belts, etc. with an adhesive to effect a good bond between the rubber and the rayon. Adhesives which contain latex and a protein adhesive such as casein have been found exceptionally satisfactory for this purpose. The treatment previously suggested includes mixing the latex and protein material and applying the mixture to the rayon. Such mixtures, especially where casein is the protein employed, become inferior if allowed to stand a few days prior to use, possibly due to some change that takes place in the latex. According to this invention this difficulty is overcome by applying the protein material and the latex separately to the rayon. The protein has a strong affinity for the rayon and is applied adjacent to it and the latex is applied over this and is thus brought next to the rubber. Although the invention relates more particularly to the application of such an adhesive, it includes the application of other adhesives which comprise two (or more) components, one of which has a strong affinity for the rayon and the other of which has a strong affinity for the rubber. The adhesive having a strong affinity for the rayon is applied directly to the rayon. For this purpose a condensation derivative of rubber may be used. Rayon treated with this adhesive may be later treated with latex or a rubber cement to secure a strong bond to the rubber. Other adhesives having a strong adhesion for rayon include emulsions of casein and latex or casein and Duprene. Treatment with either of these adhesives may be followed by treatment with latex, a rubber cement or other adhesive having a strong affinity for rubber. Processes which involve more than two treatments for the application of the adhesive are included in the invention, e. g., a process which includes first treating the rayon with casein (or other protein), second treating with a mixture of casein (or other protein) and latex, and third treating with latex. The invention will be more particularly described as applied to a process of treating rayon first with a protein, then with latex and then vulcanizing rubber to it.

According to this invention the rayon which may be in the form of cords or a woven fabric is advantageously dipped into a bath of the protein material and then without complete drying it is dipped into the latex and then dried sufficiently for use in calendering or other subsequent treatment in which the rubber is applied. Between the protein treatment and the latex treatment the cord or fabric may be drained to remove excess of the protein materials and then without drying it may be passed immediately into the latex bath. As an alternative method the protein may be thoroughly dried and the treated fabric then passed through the latex bath so slowly that the protein is softened sufficiently to form a good bond with the latex. Any suitable means may be provided for removing excess protein from the rayon and drying it more or less completely, as desired, before applying the latex.

The protein adhesives which may be employed include casein, gelatin, wheat protein, fish glue, albumin, haemoglobin, dried blood and the like. Casein has given the most satisfactory results. It is advantageously prepared for application by ball milling with ammonia.

The invention may be illustrated by the following example. A rayon cord of regenerated cellulose was first dipped in a 7% solution of casein in water and ammonia for 30 seconds. Excess of the solution was allowed to drain off and the cord was then dipped in latex of 28% rubber content. The treated cord was then dried by a preliminary low temperature heat treatment followed by drying at a higher temperature. The preliminary drying may, for example, be carried out by heating for 10 or 15 minutes in a current of air heated to around 130° F. The subsequent drying may be carried out on a drum drier heated to around 250° F. The treatment is advantageously carried out in a continuous manner by passing the cord or fabric through a bath of the protein material and then through a bath of the latex and then subjecting it to suitable drying. If fabric is employed the preliminary drying is advantageously continued while the fabric is held on a tenter.

The treated fabric and unvulcanized rubber are then assembled into a tire or a belt or the like. It may be desirable to calender the treated fabric with rubber although generally this will not be necessary. The assembly is then cured and it will be found that after cure the rubber adheres strongly to the rayon even after prolonged service and the bond is sufficient to give very high mileages on tires made in this way. Belts manufactured in this way have exceptionally long life. The tires and other products made by this process are characterized by the fact that an adhesive is employed to bond the rubber to the rayon and in the bond formed between the rubber and the rayon there is a high concentration, adjacent the rayon, of a component which has a strong affinity for the rayon, and adjacent the rubber there is a high concentration of a component which has a strong affinity for the rubber.

I claim:

1. The method of treating rayon which comprises covering the rayon with an adhesive by first applying a protein adhesive to the rayon and then applying latex thereto, thereafter applying rubber and vulcanizing.

2. The method of treating rayon which comprises covering the rayon with an adhesive by first applying a solubilized casein to the rayon and then applying latex thereto, thereafter applying rubber and vulcanizing.

3. The method of treating rayon which comprises first dipping the rayon into a casein bath and then into a latex bath and then drying, thereafter applying rubber and vulcanizing.

4. The method of treating rayon which comprises first dipping the rayon into a casein bath and then into a latex bath and then drying first at a relatively low temperature and then at a relatively higher temperature, thereafter applying rubber and vulcanizing.

5. The method of manufacturing rubber goods which contain rayon which comprises applying a protein adhesive to the rayon, applying latex to the rayon thus treated, after drying applying rubber thereto and then vulcanizing.

6. The method of manufacturing rubber goods which contain rayon which comprises applying solubilized casein to the rayon, applying latex to the rayon thus treated, after drying applying rubber thereto and then vulcanizing.

7. In the manufacture of automobile tires with rayon the steps which comprise applying a protein adhesive to the rayon, applying latex to the treated rayon and thereafter vulcanizing rubber to the protein-and-latex treated rayon.

8. In the manufacture of automobile tires with rayon cord the steps which comprise applying solubilized casein to the rayon cord, applying latex to the treated core and thereafter vulcanizing rubber to the casein-and-latex treated cord.

9. In the manufacture of the automobile tires with rayon fabric the steps which comprise applying solubilized casein to the rayon fabric, applying latex to the treated fabric and thereafter vulcanizing rubber to the casein-and-latex treated fabric.

WILLIAM HOWARD NICOL.

---

CERTIFICATE OF CORRECTION.

Patent No. 2,129,623.   September 6, 1938.

WILLIAM HOWARD NICOL.

It is hereby certified that error appears in the printed specification of the above numbered patent requiring correction as follows: Page 2, second column, line 21, claim 8, for the word "core" read cord; and that the said Letters Patent should be read with this correction therein that the same may conform to the record of the case in the Patent Office.

Signed and sealed this 15th day of November, A. D. 1938.

Henry Van Arsdale (Seal)   Acting Commissioner of Patents.

factured in this way have exceptionally long life. The tires and other products made by this process are characterized by the fact that an adhesive is employed to bond the rubber to the rayon and in the bond formed between the rubber and the rayon there is a high concentration, adjacent the rayon, of a component which has a strong affinity for the rayon, and adjacent the rubber there is a high concentration of a component which has a strong affinity for the rubber.

I claim:

1. The method of treating rayon which comprises covering the rayon with an adhesive by first applying a protein adhesive to the rayon and then applying latex thereto, thereafter applying rubber and vulcanizing.

2. The method of treating rayon which comprises covering the rayon with an adhesive by first applying a solubilized casein to the rayon and then applying latex thereto, thereafter applying rubber and vulcanizing.

3. The method of treating rayon which comprises first dipping the rayon into a casein bath and then into a latex bath and then drying, thereafter applying rubber and vulcanizing.

4. The method of treating rayon which comprises first dipping the rayon into a casein bath and then into a latex bath and then drying first at a relatively low temperature and then at a relatively higher temperature, thereafter applying rubber and vulcanizing.

5. The method of manufacturing rubber goods which contain rayon which comprises applying a protein adhesive to the rayon, applying latex to the rayon thus treated, after drying applying rubber thereto and then vulcanizing.

6. The method of manufacturing rubber goods which contain rayon which comprises applying solubilized casein to the rayon, applying latex to the rayon thus treated, after drying applying rubber thereto and then vulcanizing.

7. In the manufacture of automobile tires with rayon the steps which comprise applying a protein adhesive to the rayon, applying latex to the treated rayon and thereafter vulcanizing rubber to the protein-and-latex treated rayon.

8. In the manufacture of automobile tires with rayon cord the steps which comprise applying solubilized casein to the rayon cord, applying latex to the treated core and thereafter vulcanizing rubber to the casein-and-latex treated cord.

9. In the manufacture of the automobile tires with rayon fabric the steps which comprise applying solubilized casein to the rayon fabric, applying latex to the treated fabric and thereafter vulcanizing rubber to the casein-and-latex treated fabric.

WILLIAM HOWARD NICOL.

CERTIFICATE OF CORRECTION.

Patent No. 2,129,623.  September 6, 1938.

WILLIAM HOWARD NICOL.

It is hereby certified that error appears in the printed specification of the above numbered patent requiring correction as follows: Page 2, second column, line 21, claim 8, for the word "core" read cord; and that the said Letters Patent should be read with this correction therein that the same may conform to the record of the case in the Patent Office.

Signed and sealed this 15th day of November, A. D. 1938.

Henry Van Arsdale (Seal) Acting Commissioner of Patents.